US005329198A

United States Patent [19]

Schmidt et al.

[11] Patent Number: 5,329,198

[45] Date of Patent: Jul. 12, 1994

[54] SLIP RING OR COMMUTATOR MOTOR

[75] Inventors: Helmut Schmidt; Kurt Schmidt, both of Reichenberg, Fed. Rep. of Germany

[73] Assignee: Siemens Aktiengesellschaft, München, Fed. Rep. of Germany

[21] Appl. No.: 793,410

[22] Filed: Jan. 10, 1992

[30] Foreign Application Priority Data

| | | | |
|---|---|---|---|
| Aug. 31, 1989 | [EP] | European Pat. Off. | 89116123.4 |
| Aug. 31, 1989 | [DE] | Fed. Rep. of Germany | 8910428 |
| Aug. 8, 1990 | [DE] | Fed. Rep. of Germany | 9011574 |

[51] Int. Cl.[5] H02K 13/00

[52] U.S. Cl. 310/247; 310/42; 310/239; 310/244; 310/248

[58] Field of Search 310/239, 244, 246, 247, 310/241, 242, 245, 248, 249, 232, 233, 42, 254

[56] References Cited

U.S. PATENT DOCUMENTS

| | | | |
|---|---|---|---|
| 921,327 | 5/1909 | Wolliscroft | 310/239 |
| 1,935,787 | 11/1933 | Cullin | 310/239 |
| 4,041,339 | 8/1977 | Huber | 310/246 |
| 4,163,167 | 7/1979 | Zelt | 310/242 |
| 4,559,465 | 12/1985 | Gegneux | 310/242 |
| 4,595,851 | 6/1986 | Houben | 310/246 |
| 4,600,850 | 7/1986 | Mazzorana | 310/242 |
| 4,800,312 | 1/1989 | Wacek | 310/239 |

FOREIGN PATENT DOCUMENTS

| | | | |
|---|---|---|---|
| 0548073 | 4/1932 | Fed. Rep. of Germany . | |
| 0923803 | 2/1955 | Fed. Rep. of Germany . | |
| 0554080 | 12/1958 | Fed. Rep. of Germany . | |
| 2165227 | 7/1973 | Fed. Rep. of Germany | 310/239 |
| 0334086 | 12/1958 | Switzerland . | |
| 0410153 | 10/1966 | Switzerland . | |

*Primary Examiner*—R. Skudy

*Attorney, Agent, or Firm*—Kenyon & Kenyon

[57] ABSTRACT

In order to be able to ensure with low outlay a slip ring or commutator motor having a high level of freedom from noise and good running quality at maximum power, despite unavoidable deviations from circularity of the slip ring or commutator ground by the brushes abutting thereon, it is proposed according to the invention that the brushes (6; 7; 8) be supported such that they can pivot about an axis which runs radially in the vicinity of the surface and axially essentially in the axial direction of the commutator (1) or slip ring; that, according to one embodiment, the axis be formed by a guide pin (31; 41), which is retained in a brush housing (2) at least partially embracing the brush (6; 7) in the vicinity of the surface of the commutator (1) or the slip ring, and which is plugged axially through a guide slot (61; 71) running in the compression direction of the brush and open towards the surface of the slip ring or commutator (1), or that the brush (6) be tangentially embraced externally by the brush compression spring (3*a*) in the sense of a support with tangential supporting parts (33*a*; 34*a*), which can pivot.

26 Claims, 4 Drawing Sheets

SLIP RING OR COMMUTATOR MOTOR

BACKGROUND OF THE INVENTION

The present invention relates to a slip ring or commutator motor having at least one brush held on the stator side. The brush is pressed, by a brush compression spring, against the surface of a slip ring or commutator. The brush is pivotable about an axis parallel to the direction of the commutator axis or slip ring axis.

Such a motor is disclosed in DE-PS 548,073. In the conventional motor mentioned above, to better adapt the carbon brush to deviations in the circularity of the sliding surface of the commutator or the slip ring, the carbon brush is supported in a brush guiding box. On opposite sides of the brush guiding box, there are fitted projections having outwardly directed surfaces belonging to a common partial cylindrical surface. Corresponding contact surfaces, likewise associated with a common cylindrical surface, are provided on a retaining arm holding the brush box such that the brush can adjust itself in a suitable direction to deviations from circularity of the sliding surface of the commutator or the slip ring. The cylindrical surfaces roll on one another.

A double brush holder is disclosed in CH-A-334,086 where two brushes are each held guided in a brush box. The two brush boxes are connected by means of a cross bar. An axle originates from the cross bar. This axle has a brush compression spring with an eye at its one end plugged into it. The other end of the brush compression is wound in an elastic manner onto a cylinder with a cylinder axle. The free ends of the cylinder axle project from both end faces of the cylinder and abut, via rollers, the head ends of the brushes (i.e., the surface facing away from the commutator). The complete module, with brush box, cross bar and brush compression spring suspension, is retained on the motor side such that a brush supporting arm engages on an external wall of a brush box.

SUMMARY OF THE INVENTION

The present invention seeks to provide a significantly simpler brush holder (from production and assembly points of view) that still fully compensates for deviations in the commutator's circularity. Such a brush holder is possible in a motor of the type mentioned initially, according to the present invention, by providing a brush with a guide slot normal to the brush's sides. A guide pin is inserted through the guide slot and is held by a brush housing which at least partially embraces the brush. Such a brush holder is also possible according to another embodiment of the present invention if the brush is guided on a stator side and pivotably held solely by a bush compression spring and guide pin such that a brush housing is not required. Here, the brush compression spring and guide pin are integrally formed as a single piece. Such a brush holder is also possible according to another embodiment the present invention if a brush box and a brush compression spring are parts of a single-piece, bent, stamped pant. Holders are provided on the brush to engage pivoting holders integrally formed in or on the brush housing such that the brush is pivotably supported. Such a brush holder is also possible according to the present invention if a brush is guided on a stator side and is pivotably held solely by a brush compression spring such that a brush housing is not required. The brush compression spring has a retaining part held in a stator. This brush compression spring also has a tangential supporting part abutting a tangential end (i.e., front or back surface) of the brush in the vicinity of the commutator's surface and parallel to the axis of the commutator. The present invention seeks to provide a brush compression spring used for the pivotable, directly guided support of the brush, with an ensured adjustment capability of the brush to continuing wear, and also for brush compression. The present invention seeks a pivoting axis running continuously, essentially parallel with the axial direction of the commutator, and normal to the brush's sides in the vicinity of the commutator's or slip ring's surface.

According to one aspect of the present invention, a brush axis is formed by a pin, preferably a wire pin, in a particularly simple manner, ensuring reliable pivoting capability in accordance with the goals of the present invention. The pin is held in a brush housing and at least partially embraces the brush in the vicinity of the surface of the commutator or slip ring. According to a preferred embodiment of the present invention the pin is a single-piece component of a brush compression spring, thus simplifying production and assembly.

Particularly, with small motors, disassembly and assembly complexity can be further simplified since the brush compression spring, with the pin arranged on its one end for pivotably supporting the brush, is also used for the remaining guided retention of the brush itself. Thus, a separate box brush holder is not required. In addition, if necessary, the other end of the brush spring is rotatably or pivotably supported or fixed directly on a brush holder for retaining the complete brush arrangement. In the case of a design having a brush compression spring having a compression part which abuts a brush on the brush's radial head end (i.e., surface facing away from the commutator or the brush's top surface). The compression part also has an axial securing part securing an axial end of the brush (i.e., surface facing away from the brush compression spring's retaining part) to axially secure the position of the brush. Thus, a brush design with a pivotable axis compensating deviations in the commutator's circularity can be had without requiring a pin axis.

According to an aspect of the present invention, the brush compression spring additionally has an axial securing part abutting at least the brush's axial end face (i.e., the surface of the brush facing away from its retaining part on the stator side), preferably in the vicinity of the surface of the slip ring or commutator, to secure the axial position. To secure the axial position in the other axis direction, the brush abuts directly on a stator part, keeping the friction resulting from the pivoting movement low by providing axially projecting starting cams in an advantageous manner on the stator part. These cams are used as the only contact surface for the opposite axial end face of the brush.

DETAILED DESCRIPTION

In general, the brush of the present invention has six surfaces: a front surface; a back surface; a top surface; a bottom surface; a first side surface; and a second side surface or stator surface.

Figure 1:
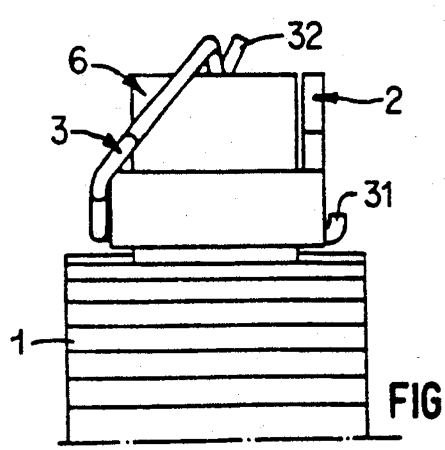
FIGS. 1 to 3 show the front, side, and top views of a brush holder according to an embodiment of the present invention.

The brush's back surface is visible in FIG. 1. The brush's front surface is the surface opposite to the back surface. The brush's top surface is visible in FIG. 3. This is the surface normally acted upon by the compression end of the brush compression spring. The brush's bottom surface is the surface opposite to the top surface (i.e., the bottom surface contacts the commutator). The brush's second side surface or stator surface is visible in FIG. 2 and is the surface adjacent to the stator part 9 in FIG. 23. The brush's first side surface is the surface opposite the brush's second side surface.

The brush has a first axis of rotation and a second axis of rotation. The brush's first axis of rotation is parallel to the commutator's axis of rotation (i.e., generally normal to the brush's first and second sides). Thus, the brush may tilt towards its front or back surface by pivoting about its first axis of rotation. The brush's second axis of rotation is perpendicular to the commutator's axis of rotation and is normal to the brush's front and back sides. Thus, the brush may tilt to one side or the other by pivoting about this second axis of rotation.

Figure 2:
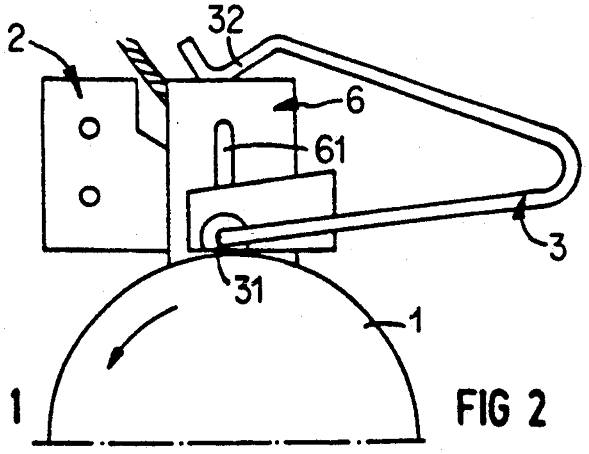
Figure 3:
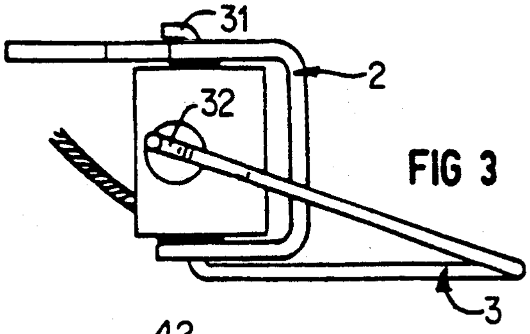

FIGS. 1 to 3 show, in three different views, a first brush holder according to the present invention. The first brush holder includes a brush 6 which slides on the surface of a commutator 1. The brush 6 is enclosed on three sides by a brush box 2 and is pressed against the commutator 1 by a brush compression spring 3. The brush 6 is supported in the radial vicinity of the surface of the commutator 1 such that it can pivot about the axis of a guide pin 31 inserted in a guide slot 61. This axis forms the brush's first axis. The guide pin 31 is supported at both of its sides by side walls of the brush box 2. Advantageously, the guide pin 31 is part of a brush compression spring 3. The compression spring 3 abuts the top surface of the brush 6 with a compression end 32 in the form of a point. The compression end 32 is at the other end of the compression spring from guide pin 31 and presses the brush 6 against the commutator 1.

Figure 4:
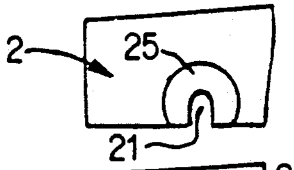
FIGS. 4 and 5 show two possibilities for supporting the pin for pivotably supporting the brush in a brush box.
Figure 5:
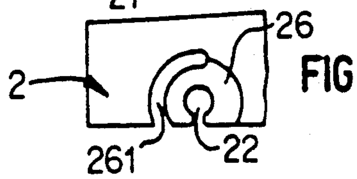

FIGS. 4 and 5 illustrate two advantageous embodiments of the present invention. The pin 31 can be either inserted into a radially open insertion slot 21 or pressed into a radially open clamping insertion slot 22 in the brush box 2. As can be seen, in particular from FIGS. 3 to 5, in the side walls of the brush box 2, facing the brush's first and second sides, projecting contact eyes 25 and 26, directed towards the brush 6, are integrally formed in the region of the insertion slots 21, 22. The contact eyes guide the pivotable brush 6 in the brush box 2 with as little friction as possible. At the same time, a spring tab 261 is integrally formed by free stamping in the contact eye 26 and clampingly retains the pressed-in guide pin 31. In the case of the assumed rotation direction of the commutator 1, indicated by the arrow direction on the commutator end face in FIG. 2, to counteract an oblique position of the brush 6 expected as a result of increasing wear, the compression end 32 of the compression spring 3 contacts the top surface of brush 6 offset eccentrically with respect to the guide slot 21, to a small extent. The direction of the offset is in the direction of rotation of the commutator.

Figure 6:
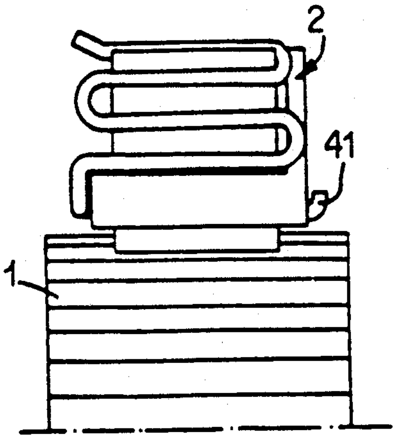
FIGS. 6 to 8 show the front, side and top views of a brush holder according to another embodiment of the present invention.
Figure 7:
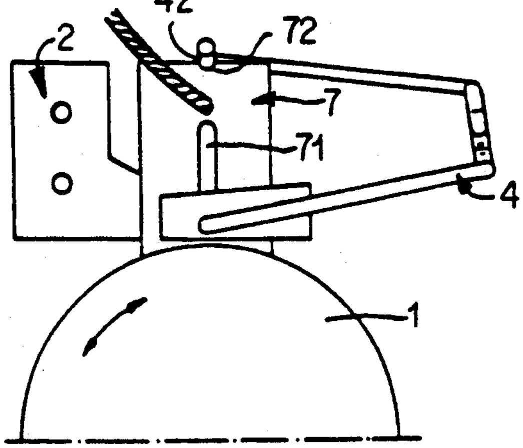
Figure 8:
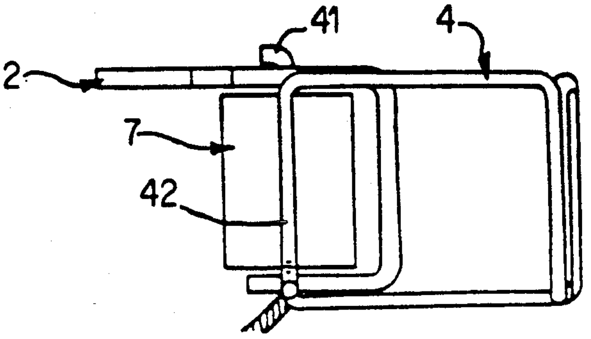

FIGS. 6 to 8 show a further aspect of the brush holder according to the present invention for a reversible motor. The guide slot 71 of the brush 7, holds the axially continuous guide pin 41. The guide pin 41 forms the first axis of the brush 7. The compression end 42 of the multiple turn brush compression spring 4 is intended to produce a compensated spring compression force. The guide slot 71 and the compression end 42 are arranged colinearly along a radial line emanating from the center of rotation of the commutator 1. In one embodiment of the present invention, the compression end 42 of the brush compression spring 4 runs in the axial direction of the commutator 1 and abuts the brush 7 to align the brush 7 parallel to the commutator's surface. Preferably, the compression end 42 fits into a corresponding, axial longitudinal, groove 72 in the brush 7.

Figure 9:
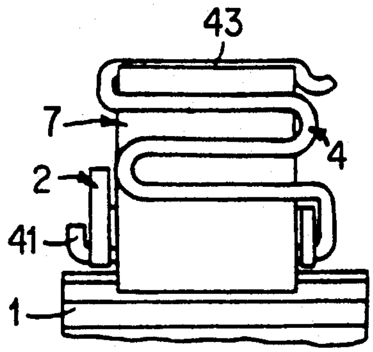
FIGS. 9 and 10 show the front and side views of the embodiment of the brush holder according to FIGS. 6 to 8.
Figure 10:
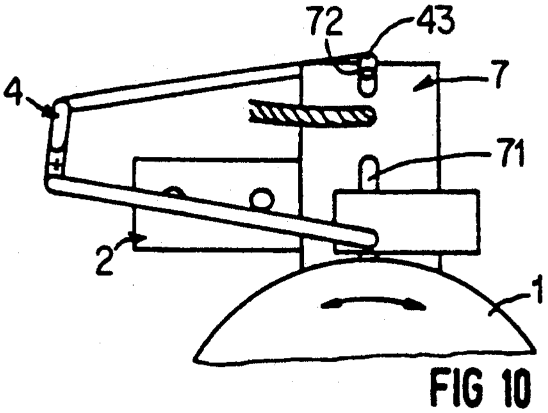

FIGS. 9 and 10 show a design of a brush holder in the present invention similar to that shown in FIGS. 6-8. However, here the multiple turn brush compression spring 4 is designed with a retaining clip at its free compression end 43. This retaining clip acts as a guide aid, parallel to the surface of the commutator, axially fixing the brush 7 such that the brush 7 is pivotably supported about the guide pin 41.

Figure 11:
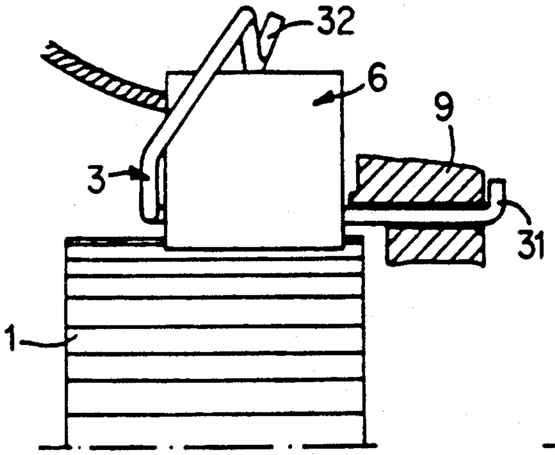
FIGS. 11 and 12 show the front and side views of a brush holder according to yet another embodiment of the present invention.
Figure 12:
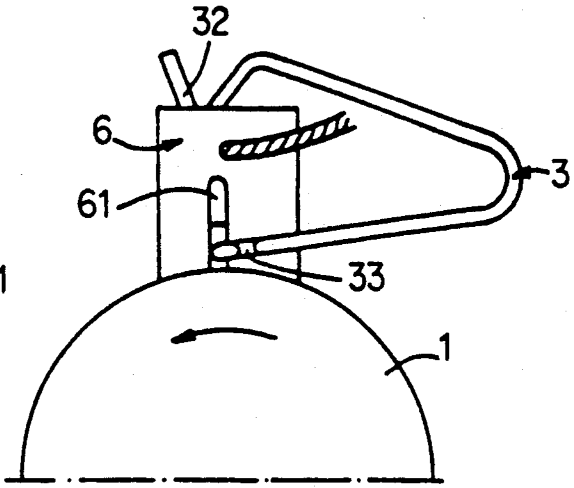

FIGS. 11 and 12 show a brush holder of the present invention similar to that shown in FIGS. 1 to 3. However, here a specific brush box is not used and the brush compression spring 3 is designed to directly guide and pivotably retain the brush 6. For this purpose, the guide pin 31 of the brush compression spring 3 is preferably elongated and supported in a stator part 9. The stator part 9 is preferably a plastic bearing plate or a brush holder. To reduce friction between the brush 6 and the guiding part of the brush compression spring 3, projecting supporting eyes 33 are integrally formed in the brush compression spring 3 similar to the embodiment shown in FIG. 3, directed to the brush 6.

Based on the brush holder in FIGS. 11 and 12, FIGS. 19 and 20 show a pivotable holder for the end of the guide pin 31 of the brush compression spring 3. The end is latched into an axial insertion opening 93 in the stator part 9. As can be seen, in particular from FIG. 20, the latched-in pivoting hook 39 axially abuts a shoulder 96 of the stator part 9 to axially secure the pin 31. As can be seen, in particular, from FIG. 19, to provide a stop limiting the head end of the brush 6 holding the compression end 32, the pivoting hook is inserted in an angled opening 97 of the stator part 9, whose angled flanks are used as a stop for the pivoting hook 39.

Based on the design of the present invention without a brush box according to FIGS. 11 and 12, FIGS. 21 to 23 show three different views of a brush holder according to the present invention having a brush 6 sliding on the surface of a commutator 1. The brush 6 is pressed via a brush compression spring 3a into a stator part 9. To compensate for deviations in the commutator's circularity the brush 6 is pivotably suspended but is not slotted and thus requires no additional machining or special design. In this case, the brush compression spring 3a, bent as a single piece from a wire, has: two retaining parts 31a, 32a, fixed in the stator part 9; two connecting, tangential supporting parts 33a, 34a, abutting each tangential end face (i.e., the front and rear surfaces) of the brush 6, pivotably supporting the brush 6; axial securing parts 35a or 36a; and an end compression part 37a abutting the top surface of the brush 6 (i.e., the surface of the brush 6 facing away from the commutator surface). On the second surface of the brush 6, (i.e., the surface facing the stator part 9), the brush 6 can run against stop cams 91 of the stator part 9 with a low coefficient of friction. Thus, despite the advantageous capability to pivot the brush to compensate for deviations from circularity of the commutator, special brush shapes are not required in this embodiment.

Figure 23:
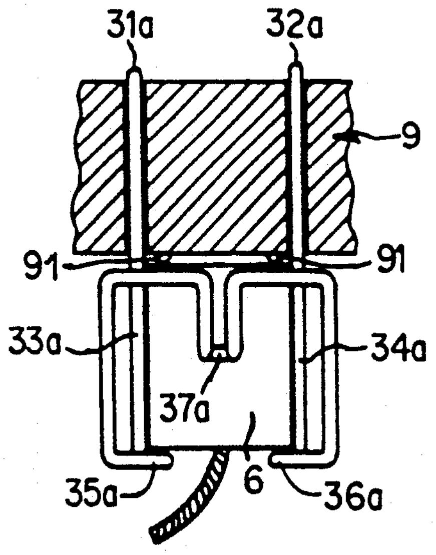

As can be seen particularly from FIG. 23, the brush compression spring 3a is bent from a continuous single-piece of wire such that its free ends form the retaining parts 31a, 32a and its center doubled-back portion abuts the top surface, i.e., the surface facing away from the commutator) of the brush 6 as compression part 37a. Between the compression part 37a and the axial securing parts 35a, 36a, the brush compression spring 3a has a plurality of spring bending parts held at a distance from the brush 6, providing a spring pressure to compress the brush compression spring 3a towards the surface of the commutator 1. The brush compression spring 3a, particularly in the region of its bends, is thus provided in an expedient manner with torsionally or bending-stressed parts of low stiffness, such that a generally constant brush pressure, independent of the radial brush height over the complete operating time, is attained. This low stiffness can preferably be achieved by means of a reduced cross section of the spring wire in these regions. By providing these regions of reduced cross section, the compression force is kept constant even for a brush 6 having a diminished radial height from being ground away over a relatively long operating period. The compression force is kept constant both for relatively large as well as for relatively small radial deflection of the compression part of 37a with respect to the retaining part 31a, 32a or to the connecting axial securing part 35a, 36a or to the tangential supporting part 33a, 34a.

The retaining parts 31a, 32a are firmly fixed in the stator part 9. The spring part located between the tangential securing parts 33a, 34a or the axial securing parts 35a, 36a and the compression part 37a is additionally designed to be elastically deformable to enable the brush compression spring 3a to pivot about an axis parallel to the commutator axis. Retaining the bends of the spring at a distance from the tangential end faces (i.e., first and second side surfaces) of the brush compression spring 3a is also preferably used for this purpose.

Figure 24:
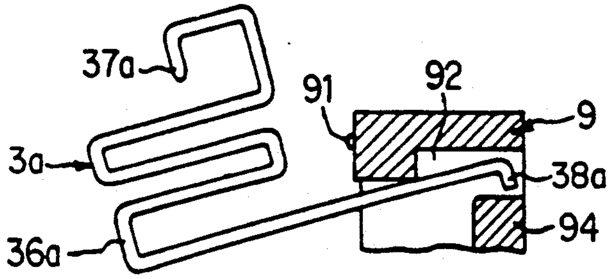
FIG. 24 shows the latching of the brush compression spring in its stator holder according to the brush holder in FIGS. 21-23.
Figure 25:
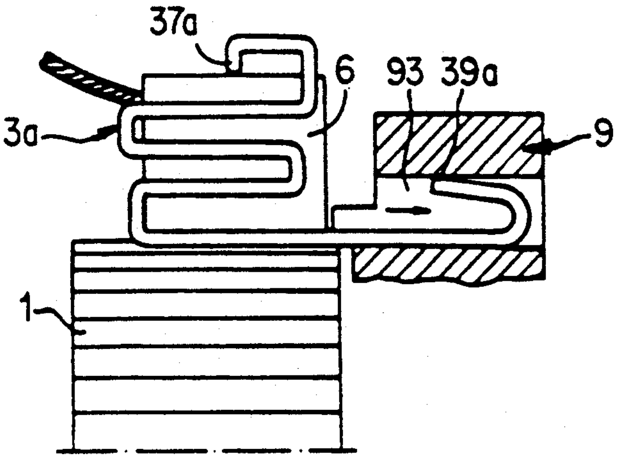
FIG. 25 shows an alternative of advantageously retaining the brush compression spring in its stator holder.
Figure 26:
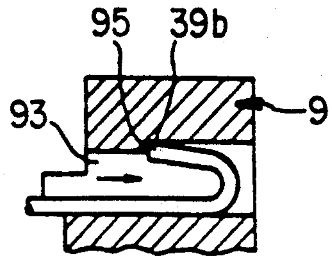
FIG. 26 shows an additional axial securing of the holder of the brush compression spring in its stator holder according to FIG. 25.

FIGS. 24 to 26 show three different embodiments for fixing the retaining parts of the brush compression spring 3a in the stator part 9. According to the embodiment shown in FIG. 24, an axial retention opening 92, open to the commutator 1, is provided with ledge 94 in the stator part 9. A self-latching device of the retaining part is provided with an angled stop angle 38a, which can be pivoted in behind the ledge 94 by temporary tipping back of the brush compression spring 3a from its operating position (according to FIGS. 21-23) to the installation point of view, as shown in FIG. 24. FIGS. 25 and 26 characterize an embodiment with an axial insertion mounting of the retaining part into an axial retention opening 93, open to the commutator 1, in the stator part 9 and self-clamping (FIG. 25) or self-latching (FIG. 26) of the retaining part with a clamping hook 39a located on the end face and bent against the insertion direction or a latching hook 39b. In the embodiment shown in FIG. 26, the clamping hook 39b is latched behind a latching cam 95 of the stator part 9.

Figure 13:
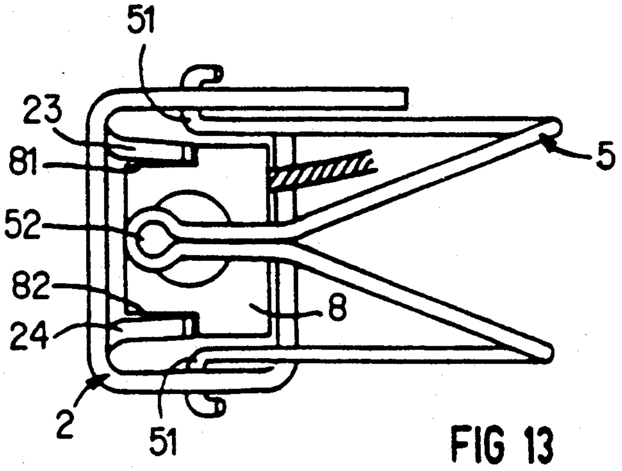
FIG. 13 shows a top view of a brush holder according to another embodiment of the present invention.

FIG. 13 shows a brush compression spring 5 with a bent compression end 52 abutting the brush's top surface and two lateral spring arms 51, 51, each supported rotatably in the walls of the brush box 2 facing the brush's first and second side surfaces. In a further aspect of the present invention, the axis pivotably supporting the brush 8 is formed by pivoting holders in the form of straps 23, 24 freely stamped and bent out from the bush box 2. These straps engage in the brush 8 in corresponding holders, preferably in the form of stepped ledges 81, 82.

Figure 14:
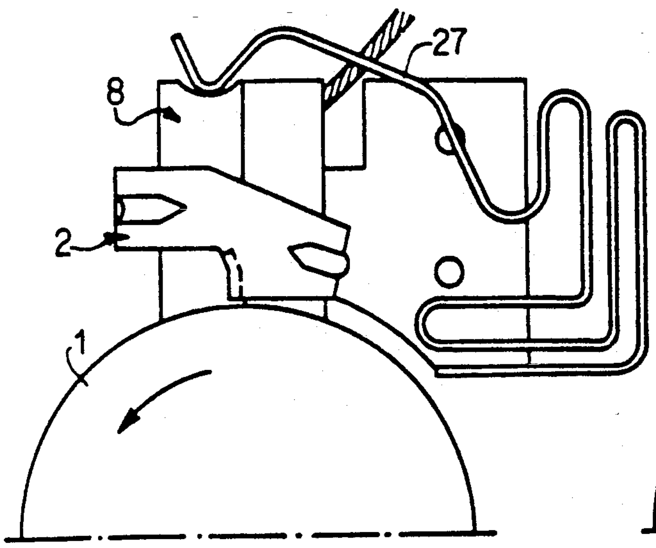
FIGS. 14 to 16 show in a side view, a top view and a top section of a brush holder according to the present invention having a brush compression spring integrally formed as a single piece on a brush box.
Figure 16:
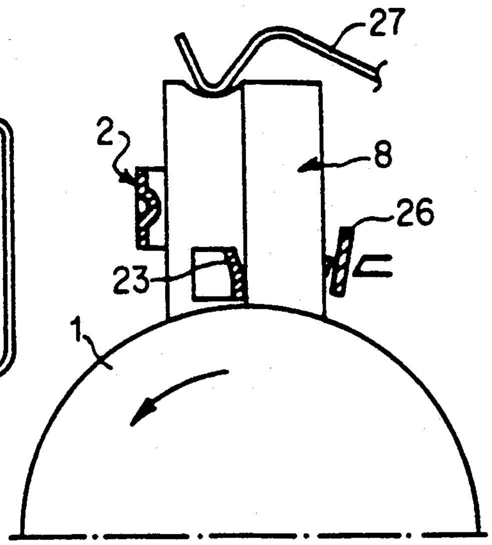
Figure 15:
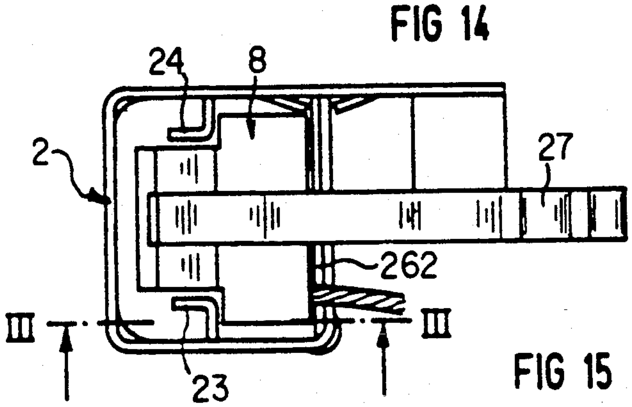
Figure 17:
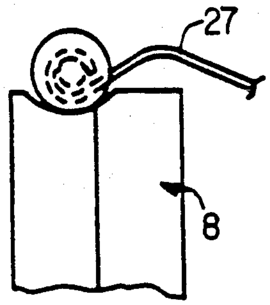
FIGS. 17 and 18 show the side and top views of a specific aspect of the compression between the brush compression spring and the brush via a compression roller.
Figure 19:
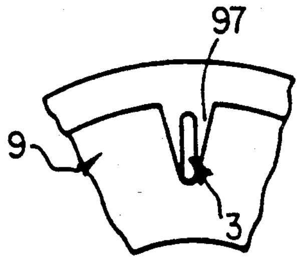
FIGS. 19 and 20 show in axial and radial sectional view a stop-limited pivoting support of the retaining part of the brush compression spring according to FIGS. 11 and 12 in a stator holder.
Figure 20:
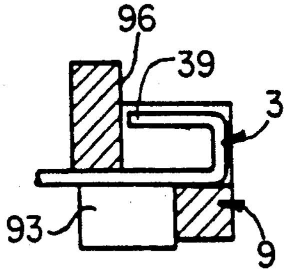
Figure 18:
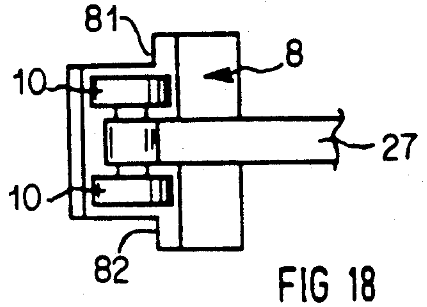
Figure 21:
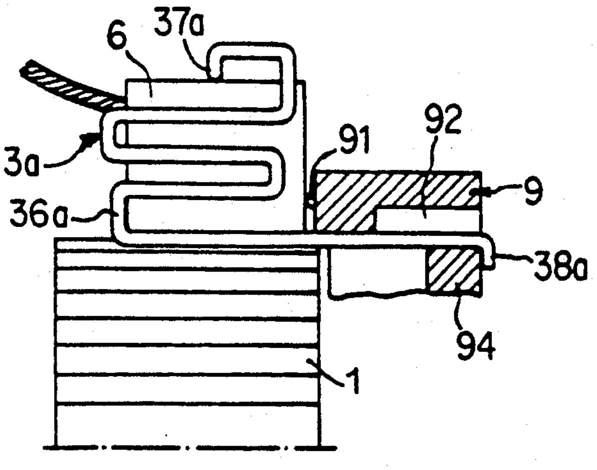
FIGS. 21 to 23 show the front, side and top views of a brush holder having only a brush compression spring.
Figure 22:
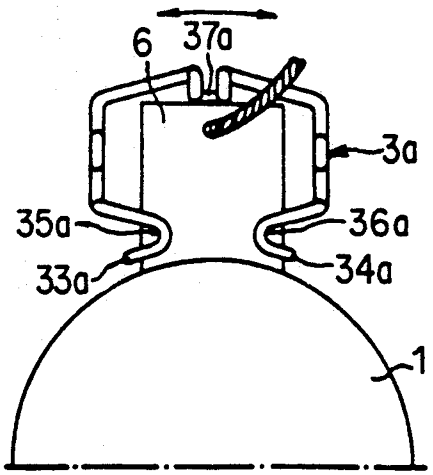

FIGS. 14 to 16 show in side and top view, and in a side sectional view along the line III—III in FIG. 15, an embodiment of the present invention having a brush holder in which the brush box 2 and the brush compression spring 27 are parts of a single-piece stamped, bent part. The compression spring 27 essentially consists of: a horizontal bent part in FIG. 14, for attaining a specific brush compression constant; an essentially vertical bent part in FIG. 14, for achieving a certain elasticity corresponding to the pivotable brush 8; and a compression end abutting the top surface of the brush 8 either directly, according to FIG. 15 or indirectly via compression rollers 10, 10, according to FIGS. 17 and 18.

To achieve good running characteristics even with a non-round commutator 1 and to position match the brush 8 to the commutator 1 such that a contact area is as large as possible, the brush 8 is pivotably supported about an axis parallel to the commutator's axis of rotation (i.e., the brush's first axis) in the vicinity of the commutator's surface. To this end, straps 23, 24 provide tangential support on the one side (i.e., the front) of the brush 8. These straps are bent out from the brush box 2 to engage corresponding radially running steps 81, 82 of the brush 8. The wall part 262 of the brush box is bent to tangentially support the other side (i.e., the back) of the brush 8. As can be seen from FIGS. 15 and 16, the straps 23, 24 or the wall part 262 of the brush box 2 support the brush 8 and are designed to run obliquely, radially, outwards, so that, between the radially inner lower edges of the straps 23, 24, inclined onto the brush 8, and of the wall part 262, a pivoting axis for the brush 8 is formed. Thus the upper end of the brush 8 can adopt an oblique position in the sense of the pivoting movement according to the present invention.

To avoid a permanent oblique brush position from the wear of the brush 8 with the assumed rotation direction of the commutator (in the arrow direction), the supporting point of the compression end of the brush compression spring 27 is offset eccentrically by a small amount in the rotation direction as is shown in FIGS. 14 and 16.

To improve brush guiding by the brush compression spring, the end of the brush compression spring on the guide pin side is guided with respect to the brush in each case in the direction axially or tangentially opposite to the end of the brush compression spring on the compression side. The actual spring part of the complete brush compression spring is advantageously located in the region of its greatest bending moment. The brush compression spring is designed as a wire formed part according to the embodiments in FIGS. 1 to 13 or as a bent stamped part according to the embodiments in FIGS. 14 to 18.

We claim:

1. A brush assembly, for use in one of a slip ring motor having a slip ring rotating about an axis and a commutator motor having a commutator rotating about an axis, comprising:
- a brush including:
  - a stator side;
  - a top surface; and
  - a bottom surface, and
- being pivotable about an axis parallel to the one of the commutator's axis and the slip ring's axis;
- a brush compression spring, exerting a force pressing the brush's bottom surface against an edge surface of the one of the commutator and the slip ring and being pivotable about an axis parallel to the one of the commutator's rotation axis and the slip ring's rotation axis;
- a guide pin; and
- a brush housing holding the guide pin and at least partially embracing the brush wherein the brush includes a slot open to an edge surface of the commutator and running in the direction of the force exerted by the brush compression spring, wherein said guide pin is sized to be inserted into said slot.

2. The brush assembly as claimed in claim 1, wherein the brush housing has a wall axially embracing the brush, and having at least one axially running insertion hole, said insertion hole retaining the guide pin.

3. The brush assembly as claimed 1, wherein the brush housing has a wall axially embracing the brush, and having at least one insertion slot open to the one of the commutator's edge surface and the slip ring's edge surface and retaining the guide pin.

4. The brush assembly as claimed in claim 1 wherein the guide pin is integrally formed with the brush compression spring.

5. The brush assembly as claimed in claim 4, wherein the brush compression spring has a compression end abutting the top surface of the brush at a point, thereby transferring the pressing force from the brush compression spring to the brush.

6. The brush assembly as claimed in claim 4, wherein the brush compression spring has a compression end abutting the top surface of the brush along a line parallel to the one of the slip ring's axis and the commutator's axis, thereby transferring the pressing force from the brush compression spring to the brush.

7. The brush assembly as claimed in claim 6, wherein the brush's top surface has a longitudinal slot being parallel with the one of the axis of the slip ring and the axis of the commutator such that the compression end of the brush compression spring fits into said longitudinal slot.

8. The brush assembly as claimed in claim 6, wherein the compression end of the brush compression spring axially fixes the brush parallel to the edge surface of the one of the slip ring and the commutator.

9. The brush assembly as claimed in claim 8 further comprising a stator part rotatably holding a free end of the guide pin located outside the brush.

10. The brush assembly as claimed in claim 8 further comprising a stator part fixedly holding a free end of the guide pin located outside the brush.

11. The brush assembly as claimed in claim 8 further comprising a stator part having a stop part pivotably housing a free end of the guide pin located outside the brush such that the free end of the guide pin may pivot through an angle corresponding to a pivoting movement of the brush
- wherein the stop part of the stator part limits the movement of the free end of the guide pin.

12. A brush assembly, for use in one of a slip ring motor having a slip ring rotating about an axis and a commutator motor having a commutator rotating about an axis, comprising:
- a brush including:
  - a stator side;
  - a top surface; and
  - a bottom surface, and
- being pivotable about an axis parallel to the one of the commutator's axis and the slip rings's axis;
- a guide pin; and
- a brush compression spring exerting a force pressing the brush's bottom surface on an edge surface of the one of the commutator and the slip ring, and a pivotably holding the brush;
- wherein the brush is provided with a slot, open to an edge surface of the one of the commutator and the slip ring, and running in the direction of the force exerted by the brush compression spring, and wherein the guide pin is sized to be inserted into said slot.

13. The brush assembly as claimed in claim 9 or 10 wherein the stator part is a plastic brush holder.

14. The brush assembly as claimed in claim 9 or 10 wherein the stator part is a plastic bearing plate.

15. The brush assembly as claimed in claim 11 wherein the stator part is a plastic brush holder.

16. The brush assembly as claimed in claim 11 wherein the stator part is a plastic bearing plate.

17. A brush assembly, for use in one of a slip ring motor having a slip ring rotating about an axis and a commutator motor having a commutator rotating about an axis, comprising:
- a brush including:
  - a stator side;
  - a top surface; and
  - a bottom surface; and
  - holders, pivotably supporting the brush about an axis parallel to the one of the commutator's rotation axis and the slip ring's rotation axis; and
- a single-piece stamped and bent part including:

a brush compression spring exerting a force pressing the brush's bottom surface against an edge surface of the one of the slip ring and the commutator; and a brush box including integrally formed pivoting holders and engaging the brush's holders to hold the brush.

18. A brush assembly, for use in one of a slip ring motor having a slip ring rotating about an axis and a commutator motor having a commutator rotating about an axis, comprising:

a brush including:

a stator side;

a top surface;

a bottom surface;

a front surface;

a back surface; and a side surface opposite said stator side, and being pivotable about an axis parallel to the rotation axis of the one of the slip ring and the commutator;

a brush compression spring including, retaining parts projecting from an area adjacent to the brush's stator side; and tangential supporting parts abutting the brush's front and back surfaces in a vicinity of the one of the slip ring and the commutator, said tangential supporting parts also being parallel to the axis of the one of the commutator and the slip ring exerting a force, and pressing the brush's bottom surface against an edge surface of the one of the slip ring and the commutator.

19. The brush assembly as claimed in claim 18 wherein the brush compression spring further includes, a compression part abutting the top surface of the brush, thereby transferring a pressing force from the brush compression spring to the brush; and axial securing parts abutting the side surface of the brush.

20. The brush assembly as claimed in claim 19 further comprising:

a stator part holding the retaining parts of the brush compression spring and axially securing the brush by contacting the stator side of the brush.

21. The brush assembly as claimed in claim 19 wherein a single-piece brush compression spring produced from a continuous brush wire includes at least one of the following:

the retaining parts;

the tangential supporting parts;

the axial securing parts; and the compression part.

22. The brush assembly as claimed in claim 20 wherein the retaining parts of the brush compression spring include two brush wire ends firmly fixed in the stator part, and wherein the brush compression spring further comprises spring parts, each being located between the axial securing parts and the compression part and each being elastically deformable about a pivoting axis such that the brush compression spring is pivotable.

23. The brush assembly as claimed in claim 20 wherein the stator part further comprises an axial opening open to the one of the commutator and the slip ring and wherein the retaining parts are inserted into the axial opening of the stator part and are self-clamping hooks, each of said clamping hooks being located on an end of each retaining part and being bent against a direction of an insertion.

24. The brush assembly as claimed in claim 20 wherein the stator part further comprises an axial opening open to the one of the commutator and the slip ring and wherein the retaining parts are inserted into the axial opening of the stator part and are self-latching via latching hooks, each of said latching hooks being located on an end of each retaining part and being bent against a direction of the insertion.

25. The brush assembly as claimed in claim 19 wherein the axial securing parts about the side surface of the brush in a vicinity of the edge surface of the one of the slip ring and the commutator thereby axially securing a position of the brush.

26. The brush assembly as claimed in claim 20 wherein the stator contacts the stator side of the brush in a region adjacent to axially projecting starting cams.

* * * * *

UNITED STATES PATENT AND TRADEMARK OFFICE

CERTIFICATE OF CORRECTION

PATENT NO. : 5,329,198

DATED : July 12, 1994

INVENTOR(S) : Helmut Schmidt et al.

It is certified that error appears in the above-indentified patent and that said Letters Patent is hereby corrected as shown below:

In column 10, after line 43, please add the following claims:

--27. The brush assembly as claimed in claim 12 wherein the guide pin is integrally formed with the brush compression spring.

28. The brush assembly as claimed in claim 27, wherein the brush compression spring has a compression end abutting the top surface of the brush at a point, thereby transferring the pressing force from the brush compression spring to the brush.

29. The brush assembly as claimed in claim 27, wherein the brush compression spring has a compression end abutting the top surface of the brush along a line parallel to the one of the slip ring's axis and the commutator's axis, thereby transferring the pressing force from the brush compression spring to the brush.

30. The brush assembly as claimed in claim 29, wherein the brush's top surface has a longitudinal slot being parallel with the one of the axis of the slip ring and the axis of the commutator such that the compression end of the brush compression spring fits into said longitudinal slot.

31. The brush assembly as claimed in claim 29, wherein the compression end of the brush compression spring

UNITED STATES PATENT AND TRADEMARK OFFICE

CERTIFICATE OF CORRECTION

PATENT NO. : 5,329,198
DATED : July 12, 1994
INVENTOR(S) : Helmut Schmidt et al.

It is certified that error appears in the above-indentified patent and that said Letters Patent is hereby corrected as shown below:

axially fixes the brush parallel to the edge surface of the one of the slip ring and commutator.

32. The brush assembly as claimed in claim 31 further comprising a stator part rotatably holding a free end of the guide pin located outside the brush.

33. The brush assembly as claimed in claim 31 further comprising a stator part fixedly holding a free end of the guide pin located outside the brush.

34 The brush assembly as claimed in claim 31 further comprising a stator part having a stop part pivotably housing a free end of the guide pin located outside the brush such that the free end of the guide pin located outside the brush such that the free end of the guide pin may pivot through an angle corresponding to a pivoting movement of the brush wherein the stop part of the stator part limits the movement of the free end of the guide pin.--

UNITED STATES PATENT AND TRADEMARK OFFICE

CERTIFICATE OF CORRECTION

PATENT NO. : 5,329,198

DATED : July 12, 1994

INVENTOR(S) : Helmut Schmidt, et al.

It is certified that error appears in the above-indentified patent and that said Letters Patent is hereby corrected as shown below:

wherein the stop part of the stator part limits the movement of the free end of the guide pin.--

Signed and Sealed this

Eighteenth Day of April, 1995

Attest:

BRUCE LEHMAN

Attesting Officer

*Commissioner of Patents and Trademarks*